(12) United States Patent
Zhou (10) Patent No.: US 12,255,578 B2
(45) Date of Patent: Mar. 18, 2025

(54) PREFABRICATED PHOTOVOLTAIC INTEGRATED PANEL WITH MOISTURE MANAGEMENT SYSTEM, AND FABRICATED PHOTOVOLTAIC ENVELOPE SYSTEM

(71) Applicant: SUZHOU VANTELL MATERIAL TECHNOLOGY CO., LTD., Jiangsu (CN)

(72) Inventor: Lei Zhou, Jiangsu (CN)

(73) Assignee: SUZHOU VANTELL MATERIAL TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/655,626

(22) Filed: May 6, 2024

(65) Prior Publication Data

US 2024/0291422 A1     Aug. 29, 2024

Related U.S. Application Data

(63) Continuation of application No. PCT/CN2021/132666, filed on Nov. 24, 2021.

(30) Foreign Application Priority Data

Nov. 12, 2021  (CN) .......................... 202111340437.6

(51) Int. Cl.
   *H02S 30/10* (2014.01)
(52) U.S. Cl.
   CPC .................... *H02S 30/10* (2014.12)
(58) Field of Classification Search
   CPC ...................................... H02S 30/10
   See application file for complete search history.

(56) References Cited

U.S. PATENT DOCUMENTS

2018/0183383 A1   6/2018  Lomasney

FOREIGN PATENT DOCUMENTS

| CN | 102653969 A | 9/2012 |
|----|-------------|--------|
| CN | 104410358   | * 3/2015 |

(Continued)

OTHER PUBLICATIONS

International Search Report cited in corresponding International Patent Application No. PCT/CN2021/132666, mailed on Aug. 10, 2022, 7 pages.

(Continued)

*Primary Examiner* — Jayne L Mershon
(74) *Attorney, Agent, or Firm* — Cooper Legal Group, LLC (57) ABSTRACT

The present application relates to a prefabricated photovoltaic integrated panel with a moisture management system, and a fabricated photovoltaic envelope system. The prefabricated photovoltaic integrated panel with the moisture management system includes a solar photovoltaic panel and the moisture management system, wherein the moisture management system includes an isobaric rainproof curtain wall and waterproof and moisture permeable cloth. The fabricated photovoltaic envelope system either includes prefabricated photovoltaic integrated panels with moisture management systems, a wall layer and flashings; or includes prefabricated photovoltaic integrated panels with moisture management systems, a building structural frame and flashings; or includes prefabricated photovoltaic integrated panels with moisture management systems and a roof body. A construction method for the fabricated photovoltaic envelope system includes software simulation, factory prefabrication and on-site fabrication.

6 Claims, 10 Drawing Sheets

(56) References Cited

FOREIGN PATENT DOCUMENTS

| | | | |
|---|---|---|---|
| CN | 104594535 | A | 5/2015 |
| CN | 108360695 | A | 8/2018 |
| CN | 111255126 | A | 6/2020 |
| CN | 111576688 | * | 8/2020 |
| CN | 111576688 | A | 8/2020 |
| CN | 111851727 | A | 10/2020 |
| CN | 211973979 | U | 11/2020 |
| CN | 212176211 | U | 12/2020 |
| CN | 213817642 | * | 7/2021 |
| CN | 213817642 | U | 7/2021 |
| CN | 216766399 | U | 6/2022 |
| KR | 101638419 | B1 | 7/2016 |

OTHER PUBLICATIONS

Office Action received in corresponding Chinese patent application No. 202111340437.6, dated Dec. 31, 2024, 32 pages.

* cited by examiner

PREFABRICATED PHOTOVOLTAIC INTEGRATED PANEL WITH MOISTURE MANAGEMENT SYSTEM, AND FABRICATED PHOTOVOLTAIC ENVELOPE SYSTEM

CROSS-REFERENCE TO RELATED APPLICATION

This application is a continuation of PCT application No. PCT/CN2021/132666, filed on Nov. 24, 2021, which claims the priority and benefit of Chinese patent application No. 202111340437.6, filed on Nov. 12, 2021. The entireties of PCT application No. PCT/CN2021/132666 and Chinese patent application No. 202111340437.6 are hereby incorporated by reference herein and made a part of this specification.

TECHNICAL FIELD

The present application relates to the field of building envelope systems, in particular to a prefabricated photovoltaic integrated panel with a moisture management system, and a fabricated photovoltaic envelope system.

BACKGROUND ART

As an important part of a building, a building envelope is a main member for separating the indoor from the outdoor. A traditional building envelope is mainly made of masonry or reinforced concrete, which has effects of protection and security, wind and rain protection as well as heat insulation and heat preservation.

In recent years, more and more building envelopes are made of a functional prefabricated integrated plate. At the same time, in order to adapt to the development of society and improve the comfort, durability and functionality of buildings, various multifunctional building envelopes have been developed and used one after another, and the building envelopes have also been updated from single structures to systems with multi-layer structures. For example, a multifunctional envelope system in which a decorative plate, a heat insulation plate, waterproof and moisture permeable cloth, a porous plate and a fireproof plate are combined has a plurality of functions such as beauty, heat insulation, waterproofness, moisture exhaust, heat preservation, noise elimination, and fireproofness, thereby providing higher quality for buildings.

At present, with the development of society and the improvement of human living standards, new requirements have been put forward for the envelope system, and energy conservation and emission reduction have become new demands; a conventional envelope system is relatively weak in energy conservation and emission reduction ability; and therefore, improving the performances of energy conservation and emission reduction of the envelope system has become the focus of research.

SUMMARY

In order to improve the functions of energy conservation and emission reduction of an envelope system, the present application provides a prefabricated photovoltaic integrated panel with a moisture management system, and a fabricated photovoltaic envelope system.

In a first aspect, a prefabricated photovoltaic integrated panel with a moisture management system is provided, including:

a solar photovoltaic panel and a moisture management system which are overlapped with each other; the moisture management system comprises an isobaric rainproof curtain wall and waterproof and moisture permeable cloth, and the isobaric rainproof curtain wall is connected to the solar photovoltaic panel.

In a second aspect, a fabricated photovoltaic envelope system is provided, including:

a plurality of prefabricated photovoltaic integrated panels without joist layers and with a moisture management system, a wall layer, and a plurality of flashings;

the plurality of prefabricated photovoltaic integrated panels with a moisture management system are arranged in a matrix and are installed outside the wall layer with a plurality of joists; a flashing is installed below each of the plurality of prefabricated photovoltaic integrated panels with a moisture management system, and a gap is formed between each of the plurality of flashings and each of the plurality of prefabricated photovoltaic integrated panels with a moisture management system, which are located above and below the flashing.

In a third aspect, provided is a construction method for the fabricated photovoltaic envelope system, including:

S1, optimizing parameters of the plurality of prefabricated photovoltaic integrated panels with a moisture management system by simulation software in combination with building requirements and geographical and environmental factors of a destination;

S2, prefabricating the plurality of prefabricated photovoltaic integrated panels (100) with a moisture management system; and S3, transporting the plurality of prefabricated photovoltaic integrated panels (100) with a moisture management system to the destination, and performing on-site installation.

In conclusion, the present application has at least one of the following beneficial technical effects:

1. By using the solar photovoltaic panel in the present application, the prefabricated photovoltaic integrated panel is enabled to have an effect of power supply capacity, which can not only be used for a constructed building, but also be outwards transmitted to a power grid, thereby saving equipment materials and power costs, also reducing energy consumption and environmental damage caused by conventional power generation, and achieving the effects of energy conservation and emission reduction. In addition, the solar photovoltaic panel can also adjust a temperature in the building by absorbing heat, thereby reducing a load and energy consumption of an air conditioner, and further playing roles of energy conservation and emission reduction.

2. The moisture management system in the present application has effects of moisture exhaust and water resistance, which is beneficial to the reduction of water and moisture accumulated in the prefabricated photovoltaic integrated panel, thereby protecting the solar photovoltaic panel and reducing the problem of performance degradation of the solar photovoltaic panel due to moisture.

3. The heat insulation plate arranged in the present application has an effect of heat insulation, and the first structural plate arranged in the present application plays a support role.

4. By disposing the joist layer and the second structural plate in the present application, a skin effect is formed, which improves the mechanical strength and structural stability of the prefabricated photovoltaic integrated panel, and provides necessary conditions for taking the prefabricated photovoltaic integrated panel as a wall plate independently.
5. By disposing the heat preservation layer in the present application, the heat preservation property of the prefabricated photovoltaic integrated panel is improved; and by disposing the moisture barrier film, moisture diffused from the indoor to the envelope system is reduced.
6. By disposing the prefabricated photovoltaic integrated panel, the envelope system in the present application has functions such as good and long-term energy supply, energy conservation and emission reduction, water resistance and moisture exhaust, heat preservation and heat insulation, fireproofness and sound insulation; and due to the combination of passive energy conservation and active energy conservation, the envelope system has zero energy consumption or approximate zero energy consumption.
7. As a BiPv (photovoltaic building), the envelope system in the present application omits secondary installation of the solar photovoltaic panel and reduces the cost of the fabricated photovoltaic envelope system.
8. By software simulation, calculation, analysis and optimization in the present application, control parameters of all parts of the prefabricated photovoltaic integrated panel are optimized, then, the prefabricated photovoltaic integrated panel meeting building requirements and environmental conditions of a destination is obtained, and the effects such as energy conservation and emission reduction as well as heat preservation and moisture exhaust of the fabricated photovoltaic envelope system consisting of the prefabricated photovoltaic integrated panels are improved.
9. By high prefabrication in a factor and on-site fabrication on a destination (construction site) in the present application, flying dust generated by on-site construction is reduced, which is beneficial to environmental protection; at the same time, the efficiency and safety of on-site construction are also improved, and construction limitations from on-site conditions are reduced.

Description for reference numerals in the accompanying drawing: 1, solar photovoltaic panel; 2, moisture management system; 21, isobaric rainproof curtain wall; 211, base layer; 212, bulge; 213, gap; 214, glass fiber mesh; 22, waterproof and moisture permeable cloth; 3, integrated frame; 31, breathable moisture exhaust hole; 4, heat insulation plate; 5, first structural plate; 51, heat preservation and sound insulation cushion layer; 6, joist layer; 61, joist; 7, heat preservation layer; 8, second structural plate; 9, moisture barrier film; 100, prefabricated photovoltaic integrated panel with moisture management system; 200, wall layer; 201, lightweight installation joist; 300, flashing; 301, water guide folding edge; 400, building structural frame; and 500, roof body.

DETAILED DESCRIPTION

The present application will be further described in detail below in conjunction with the accompanying drawings 1 to 10.

Embodiment 1

Figure 1:
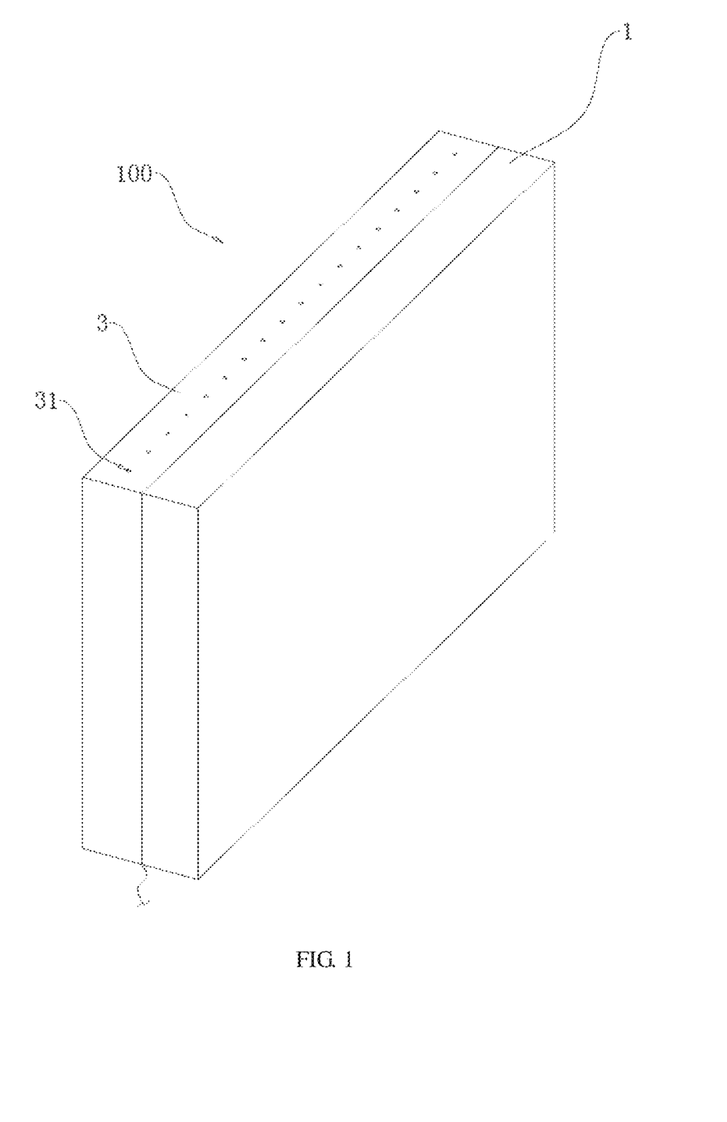
FIG. 1 is a schematic three-dimensional diagram of a prefabricated photovoltaic integrated panel in embodiment 1 of the present application.
Figure 2:
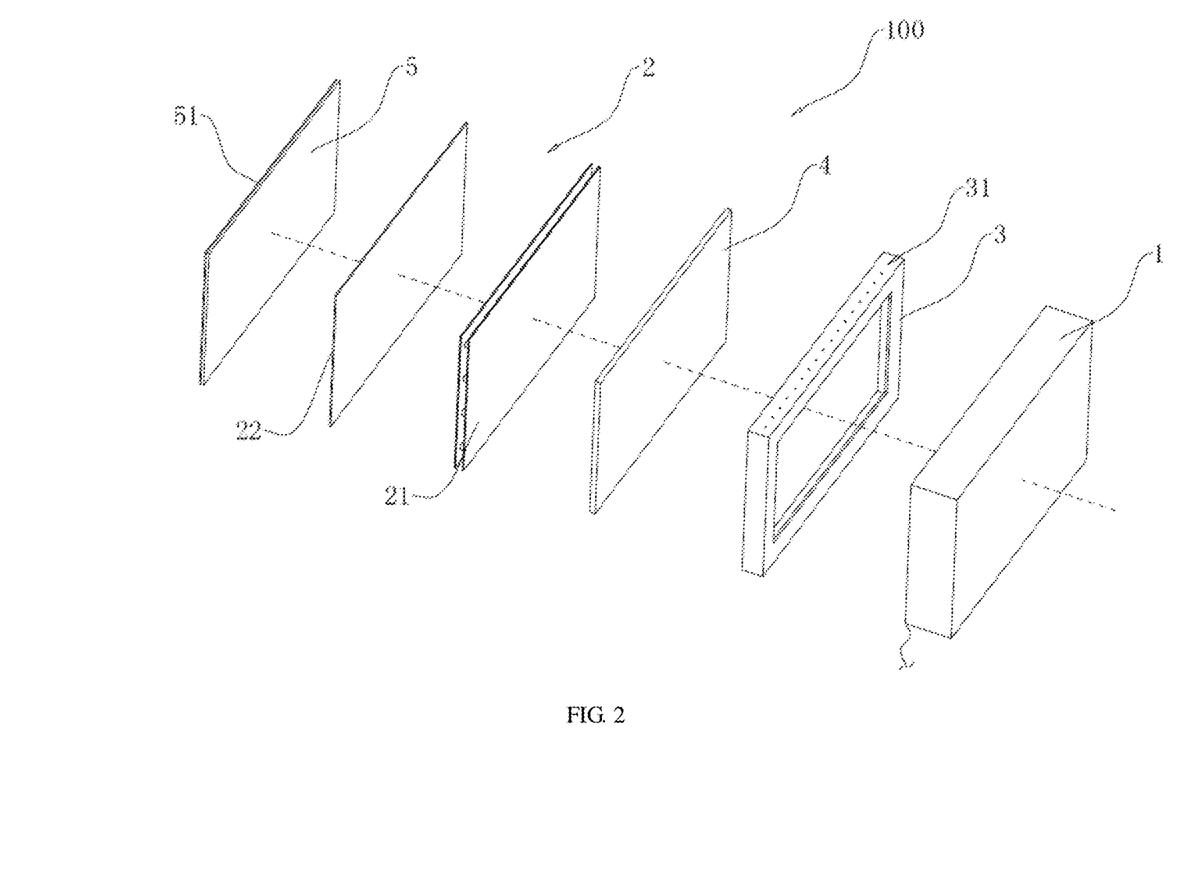
FIG. 2 is a schematic exploded diagram of the prefabricated photovoltaic integrated panel in embodiment 1 of the present application.

The present embodiment discloses a prefabricated photovoltaic integrated panel 100 with a moisture management system, which is applicable to the reconstruction of an existing wall or roof. Refer to FIG. 1 and FIG. 2, the prefabricated photovoltaic integrated panel 100 with the moisture management system (hereinafter referred to as prefabricated photovoltaic integrated panel 100) includes a solar photovoltaic panel 1, an integrated frame 3 as well as a heat insulation plate 4, the moisture management system 2 and a first structural plate 5 which are installed in the integrated frame 3; the heat insulation plate 4, the moisture management system 2 and the first structural plate 5 sequentially overlap together; and the solar photovoltaic panel 1 is connected to the outside of the integrated frame 3 and is adjacent to the heat insulation plate 4.

Figure 3:
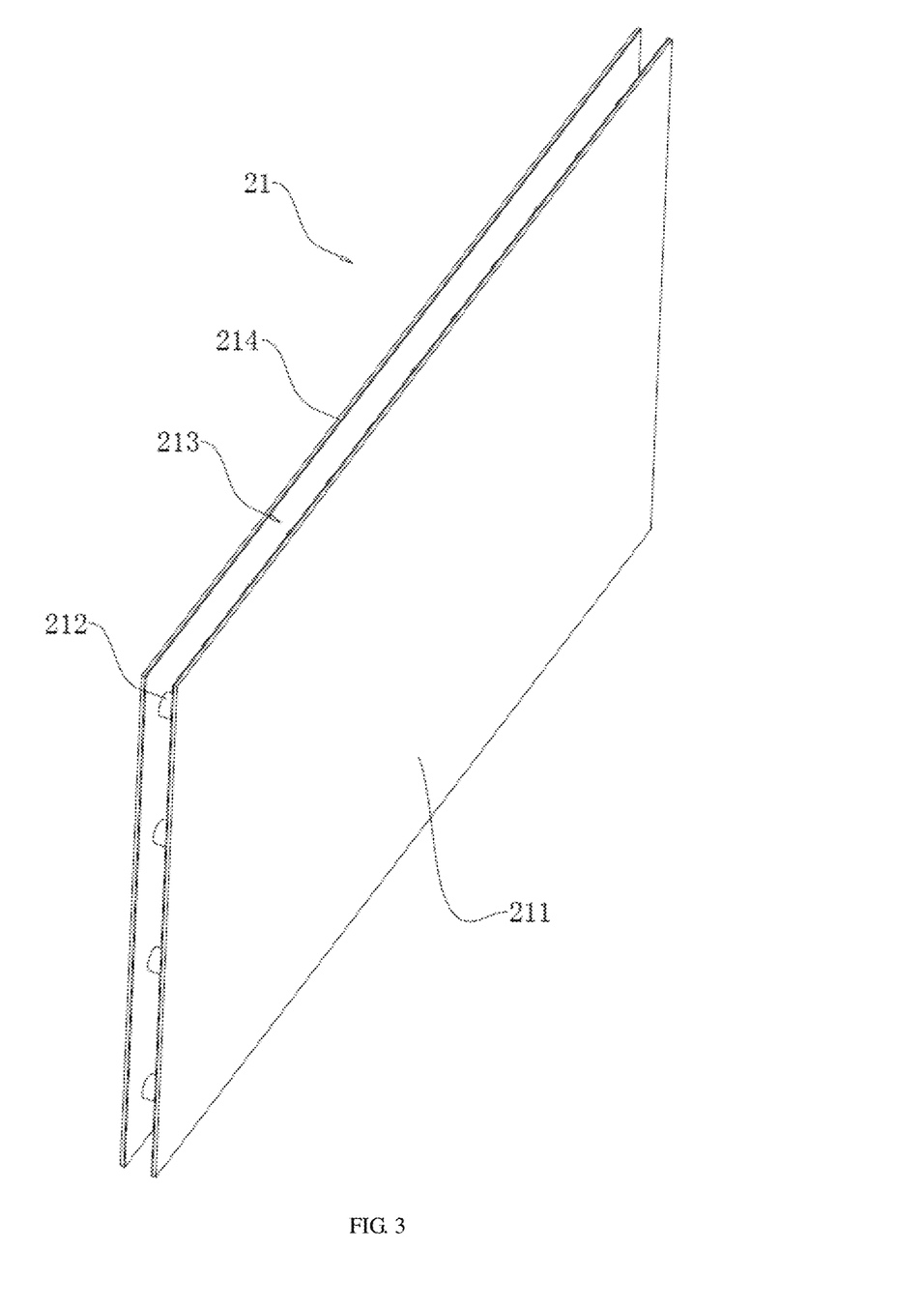
FIG. 3 is a schematic three-dimensional diagram of an isobaric rainproof curtain wall in embodiment 1 of the present application.

Refer to FIG. 2 and FIG. 3, the moisture management system 2 consists of an isobaric rainproof curtain wall 21 and waterproof and moisture permeable cloth 22 which overlap with each other and are connected together; at the same time, the isobaric rainproof curtain wall 21 is further connected to the heat insulation plate 4, and the waterproof and moisture permeable cloth 22 is further connected to the first structural plate 5. The isobaric rainproof curtain wall 21 includes two base layers 211, two layers of glass fiber meshes 214, a plurality of bulges 212; the two base layers 211 are both rectangular XPE (cross linked polyethylene foam) plates and are arranged in parallel; the two layers of glass fiber meshes 214 and the two base layers 211 are in one-to-one correspondence and overlap on inner sides (with sides, facing a position between the two base layers 211 as the inner sides) of the corresponding base layers 211; the bulges 212 are cylindrical, two ends thereof are vertically connected to the two glass fiber meshes 214 respectively, and the plurality of bulges 212 are arranged in a matrix between the two glass fiber meshes 214; and the bulges 212 are made of the same material as the base layers 211 (that is, they are both made of XPE), and the base layers 211, the glass fiber meshes 214 and the bulges 212 are connected together by hot melt adhesion. The waterproof and moisture permeable cloth 22 is of a rectangular structure and is connected to the base layer 211 close to the first structural plate 5 by nailing.

Refer to FIG. 2 and FIG. 3, the bulges 212 are arranged between the two layers of glass fiber meshes 214, so that a gap 213 is formed between the two glass fiber meshes 214, i.e., the two base layers 211. The gap 213 can provide a space for exhausting water and moisture in the prefabricated photovoltaic integrated panel 100; wherein the water can overcome capillarity at the gap 213, and can downwards flow and be exhausted along the gap 213 under a drive action of the gravity; and the moisture can be taken away by air blown into the gap 213 from bottom to top. Moreover, a pressure in the gap 213 is equal to or approximately equal to an external pressure, which can effectively stop external water seepage at an air pressure. In addition, the gap 213 can also cut off a migration path of the water and the moisture in the prefabricated photovoltaic integrated panel 100. Therefore, by displaying the gap 213, the effects of moisture exhaust and water resistance can be achieved, the moisture and the water accumulated in the prefabricated photovoltaic integrated panel 100 are reduced, not only can damage of the moisture to the mechanical structure of the prefabricated photovoltaic integrated panel 100 be reduced, but also impacts of the moisture and the water on performances of the solar photovoltaic panel 1 are reduced. At the same time, the gap 213 forms a broken bridge structure in the prefabricated photovoltaic integrated panel 100, which hinders the movement of heat and sound in the prefabricated photovoltaic integrated panel 100, thereby further playing roles in heat insulation and sound insulation. Therefore, by disposing the gap 213, the photovoltaic integrated panel 100 has high performances and long-term high heat preservation efficiency.

In addition, the XPE has a uniform hole structure, which is beneficial to further improvement of the effects of heat insulation and sound insulation of the prefabricated photovoltaic integrated panel 100. In some other implementation solutions, the bulges 212 can also be made of one of IXPE, EVA, PU, PP, PVC, and ECB (ethylene copolymer modified asphalt). At the same time, the base layers 211 can also be made of one of the IXPE (irradiated cross-linked polyethylene foam) and the waterproof and moisture permeable cloth 22.

Refer to FIG. 2, the solar photovoltaic panel 1 is a rectangular plate, equipment such as an electric wire and a photovoltaic system connector are further matched with the solar photovoltaic panel 1. In the present implementation solution, the equipment is of a conventional structure so as not to be described herein. The heat insulation plate 4 is a rectangular plate having the same length and width as the base layers 211, and is specifically a graphite polystyrene plate which has good effects of heat insulation and heat preservation. Of course, in other implementation solutions, the heat insulation plate 4 can also select a rock wool plate, a glass fiber heat preservation cotton plate, or an aerogel plate.

Refer to FIG. 2, the first structural plate 5 has the same length and width as the base layers 211. In the present implementation solution, the first structural plate 5 is specifically a gypsum plate provided with a heat preservation and sound insulation cushion layer 51 on a side surface facing away from the moisture management system 2; gypsum has a porous structure, and therefore, in the present implementation solution, the first structural plate 5 can also improve the effects of heat preservation and sound elimination of the prefabricated photovoltaic integrated panel 100; in addition, gypsum also has incombustibility, and therefore, the first structural plate 5 can also provide a fireproof performance for the prefabricated photovoltaic integrated panel 100. In other implementation solutions, the first structural plate 5 can also select a cement-fiber plate, a magnesium crystal plate, an OSB plate or other conventional structural plates provided with the heat preservation and sound insulation cushion layer 51 on a side surface respectively.

Refer to FIG. 2, the integrated frame 3 is a rectangular frame, and is enclosed by an L-shaped metal strip, and has the same length and width as the solar photovoltaic panel 1; the heat insulation plate 4, the moisture management system 2 and the first structural plate 5 (including the heat preservation and sound insulation cushion layer 51) are sequentially installed in the integrated frame 3 and are fixed by using bolts; and the solar photovoltaic panel 1 is fixed to an outer surface of a side, close to the heat insulation plate 4, of the integrated frame 3 by using bolts, thereby integrating all parts of the prefabricated photovoltaic integrated panel 100 into a whole. A plurality of breathable moisture exhaust holes 31 are formed in frame bars (i.e., upper and lower sides of a rectangular frame) on upper and lower sides of the integrated frame 3; and these breathable moisture exhaust holes 31 are equidistantly arranged along length directions of the frame bars, and directly face the gap 213 of the isobaric rainproof curtain wall, thereby facilitating exhausting the moisture and the water in the gap 213.

The prefabricated photovoltaic integrated panel 100 with the moisture management system in the present embodiment is based on a principle that the solar photovoltaic panel 1, the heat insulation plate 4, the moisture management system 2 and the first structural plate 5 are sequentially arranged together from outside to indoor, and are integrated into a rectangular plate body through the integrated frame 3. The solar photovoltaic panel 1 is located on the outmost side of the prefabricated photovoltaic integrated panel 100, not only can be used as a structural facing layer, but also can be used for converting light energy into electric energy which is used by a building with the prefabricated photovoltaic integrated panel 100 or outputted to a power grid, thereby saving equipment materials and power costs; at the same time, the solar photovoltaic panel 1 can also adjust a temperature in the building by absorbing heat. The heat insulation plate 4 plays roles in heat insulation and heat preservation. The moisture management system 2 is arranged, which is beneficial to playing roles in moisture exhaust and water resistance and the reduction of water and moisture accumulated in the prefabricated photovoltaic integrated panel 100, thereby being not only beneficial to the reduction of a phenomenon of damaging the mechanical performance of the prefabricated photovoltaic integrated panel 100 by the moisture, but also reducing the problem of performance degradation of the solar photovoltaic panel 1 due to moisture; and at the same time, the moisture management system 2 can also achieve functions of heat insulation and heat preservation, sound insulation and noise reduction. The first structural plate 5 can play a support role, and can also provide better fireproof, heat preservation and noise reduction performances for the prefabricated photovoltaic integrated panel 100.

Embodiment 2

Figure 4:
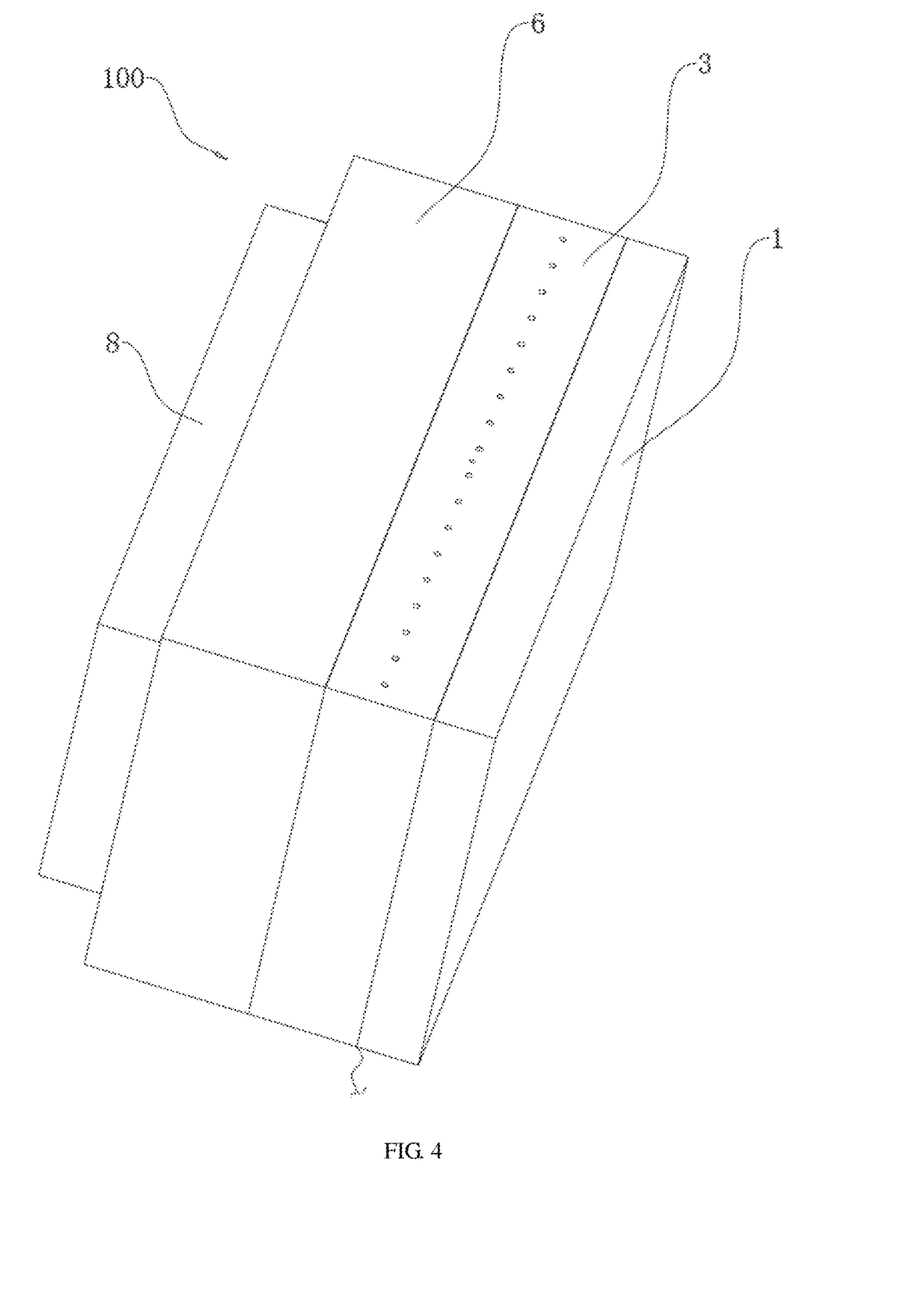
FIG. 4 is a schematic three-dimensional diagram of a prefabricated photovoltaic integrated panel in embodiment 2 of the present application.
Figure 5:
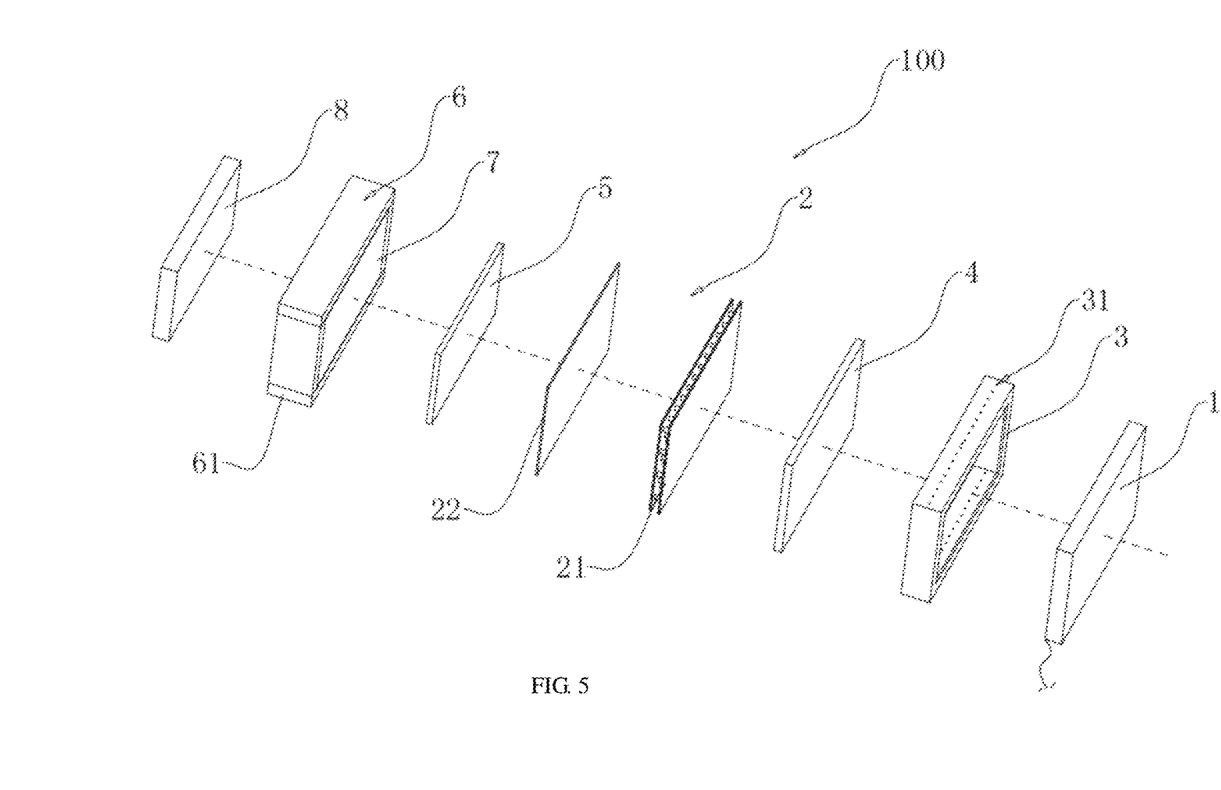
FIG. 5 is a schematic exploded diagram of the prefabricated photovoltaic integrated panel in embodiment 2 of the present application.

The present embodiment discloses a prefabricated photovoltaic integrated panel 100 with a moisture management system. Refer to FIG. 4 and FIG. 5, the present embodiment is basically the same as embodiment 1 except that the prefabricated photovoltaic integrated panel 100 in the present embodiment is applicable to new construction of a wall. Therefore, the prefabricated photovoltaic integrated panel 100 with the moisture management system in the present embodiment includes a solar photovoltaic panel 1, the moisture management system 2, an integrated frame 3, a heat insulation plate 4, a first structural plate 5, a joist layer 6, a heat preservation layer 7, and a second structural plate 8. At the same time, the first structural plate 5 is not provided with a heat preservation and sound insulation cushion layer 51.

Refer to FIG. 4 and FIG. 5, the solar photovoltaic panel 1, the heat insulation plate 4, the moisture management system 2, the first structural plate 5, the joist layer 6 and the second structural plate 8 are sequentially arranged together from outdoor to indoor. Moreover, the heat insulation plate 4, the moisture management system 2 and the first structural plate 5 are sequentially installed in the integrated frame 3 and are fixed by using bolts; the solar photovoltaic panel 1 is located outside a side, close to the heat insulation plate 4, of the integrated frame 3 and is fixed to the integrated frame 3 by using bolts, and the joist layer 6 is located outside a side close to the first structural plate 5, of the integrated frame 3 and is fixed to the integrated frame 3 by using bolts; the second structural plate 8 is fixed to a side surface, facing away from the integrated frame 3, of the joist layer 6 by using bolts, and a center of the second structural plate 8 is collinear with a center of the joist layer 6; and a coating facing is coated on a side surface, facing away from the joist layer 6, of the second structural plate 8.

Refer to FIG. 5, the joist layer 6 is of a frame structure shaped like a rectangular plate and has the same length and width as the integrated frame 3; and the joist layer 6 is formed by arranging a plurality of joists 61. The joists 61 are C-shaped lightweight joists, and inner sides thereof are provided with tracing cavities for tracing an electric wire of the solar photovoltaic panel 1. The frame structure consisting of the plurality of joists 61 is filled with the heat preservation layer 7. In the present implementation solution, the heat preservation layer 7 is made of graphite polystyrene with good heat preservation property; and in some other implementation solutions, the heat preservation layer 7 can also be made of one or a combination of aerogel, rock wool, XPE foam, and IXPE foam. The second structural plate 8 is a rectangular plate; and in order to ensure that the second structural plate 8 can be placed into a prefabricated building structural frame during installation, the length and width of the second structural plate 8 are smaller than those of the joist layer 6. In the present implementation solution, the second structural plate 8 is specifically a gypsum plate; and in other implementation solutions, the second structural plate 8 can also be a cement-fiber plate, a magnesium crystal plate, or other conventional structural plates with a fireproof performance.

The joist layer 6 and the second structural plate 8 are matched with the first structural plate 5 to form a skin effect, which improves the overall mechanical strength and structural stability of the prefabricated photovoltaic integrated panel 100, improves the bearing capacity of the prefabricated photovoltaic integrated panel 100, so that the prefabricated photovoltaic integrated panel 100 can be independently used as a wall plate. By disposing the heat preservation layer 7, the heat preservation property of the prefabricated photovoltaic integrated panel 100 is improved, and then, the comfort level of a constructed building can be improved.

Embodiment 3

Figure 6:
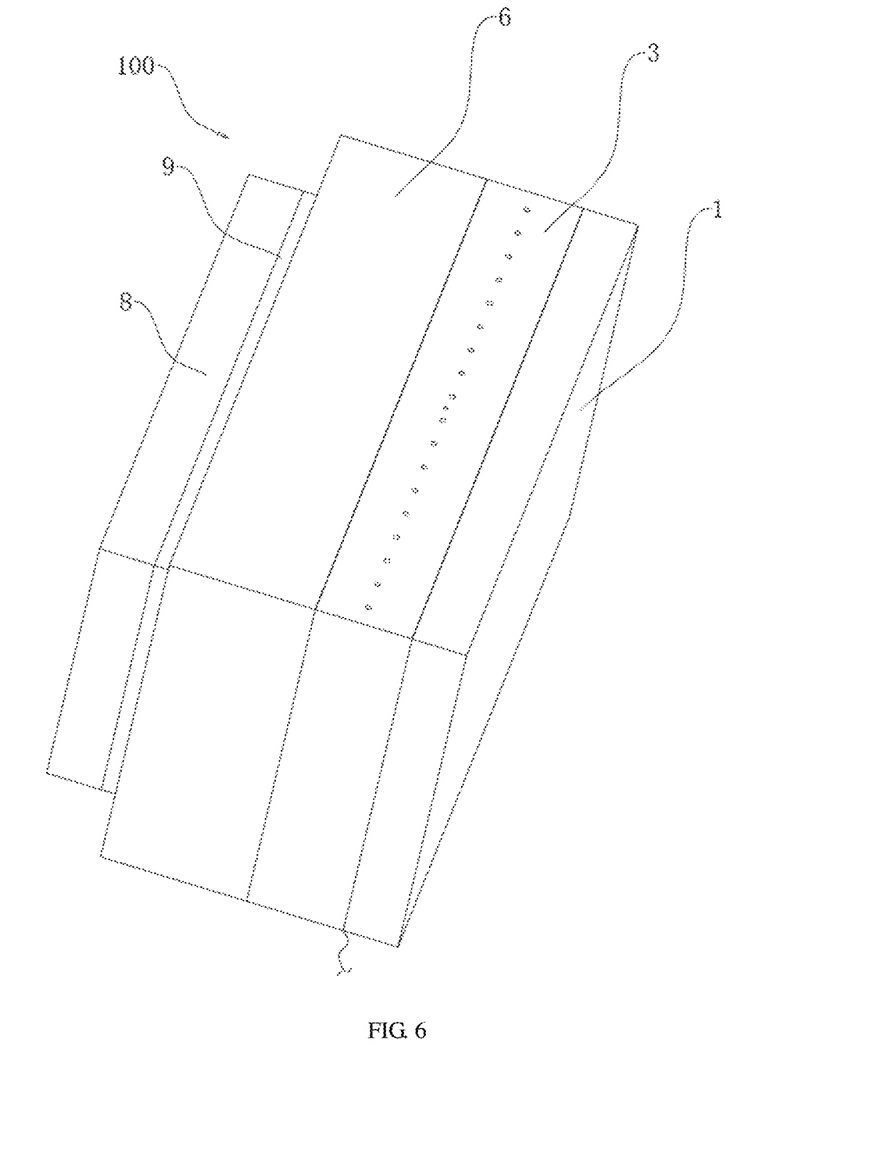
FIG. 6 is a schematic three-dimensional diagram of a prefabricated photovoltaic integrated panel in embodiment 3 of the present application.
Figure 7:
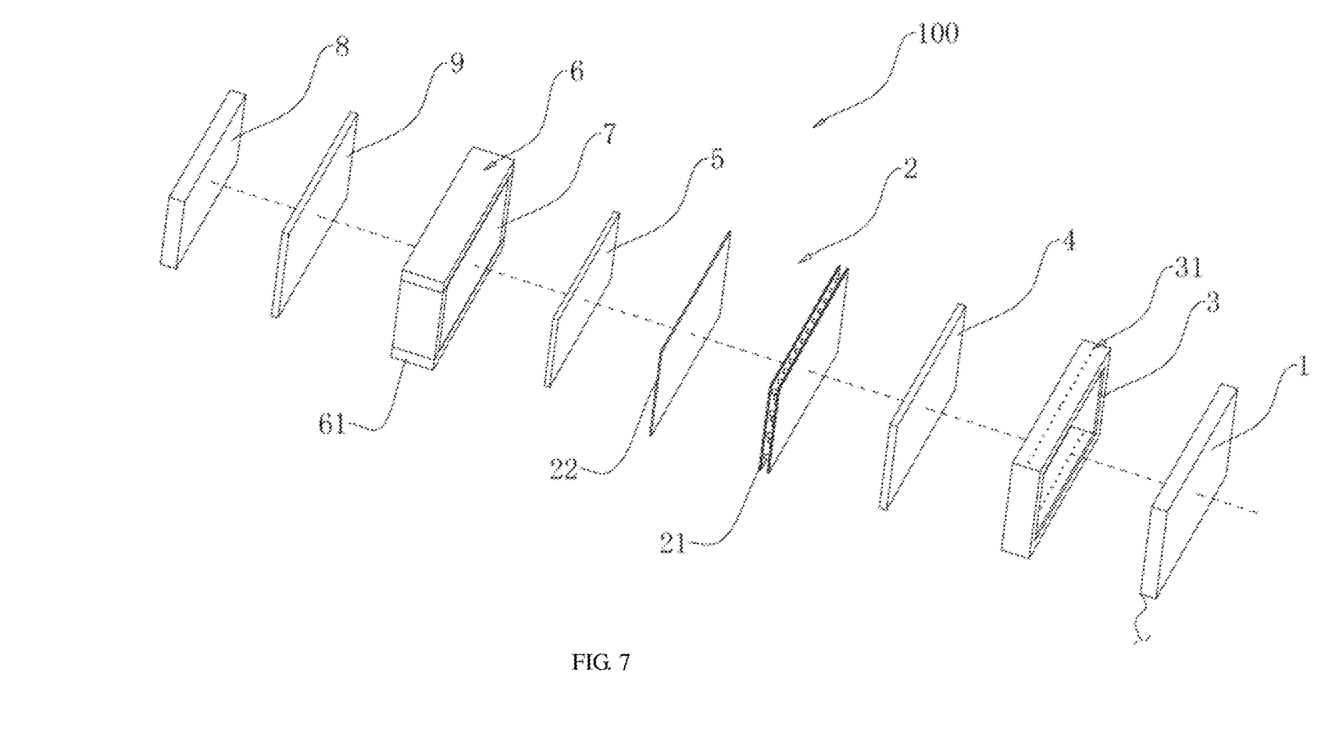
FIG. 7 is a schematic exploded diagram of the prefabricated photovoltaic integrated panel in embodiment 3 of the present application.

The present embodiment discloses a prefabricated photovoltaic integrated panel 100 with a moisture management system. Refer to FIG. 6 and FIG. 7, the present embodiment is basically the same as embodiment 2 except that the prefabricated photovoltaic integrated panel 100 in the present embodiment is mainly applied to severe cold areas, and therefore, the prefabricated photovoltaic integrated panel 100 in the present embodiment further includes a moisture barrier film 9. Specifically, the prefabricated photovoltaic integrated panel 100 consists of a solar photovoltaic panel 1, the moisture management system 2, an integrated frame 3, a heat insulation plate 4, a first structural plate 5, a joist layer 6, a heat preservation layer 7, a second structural plate 8, and a moisture barrier film 9.

Refer to FIG. 6 and FIG. 7, the moisture barrier film 9 is rectangular and has the same length and width as the second structural plate 8. The moisture barrier film 9 is located between the joist layer 6 and the second structural plate 8 and is connected to the joist layer 6 and the second structural plate 8 by using bolts. By disposing the moisture barrier film 9, moisture migration from the indoor to the inside of the prefabricated photovoltaic integrated panel 100 can be effectively stopped, the contents of moisture and water in the prefabricated photovoltaic integrated panel 100 are reduced, and then, impacts of the moisture on the structural strength of the prefabricated photovoltaic integrated panel 100 and performances of the solar photovoltaic panel 1 are reduced.

Embodiment 4

Figure 8:
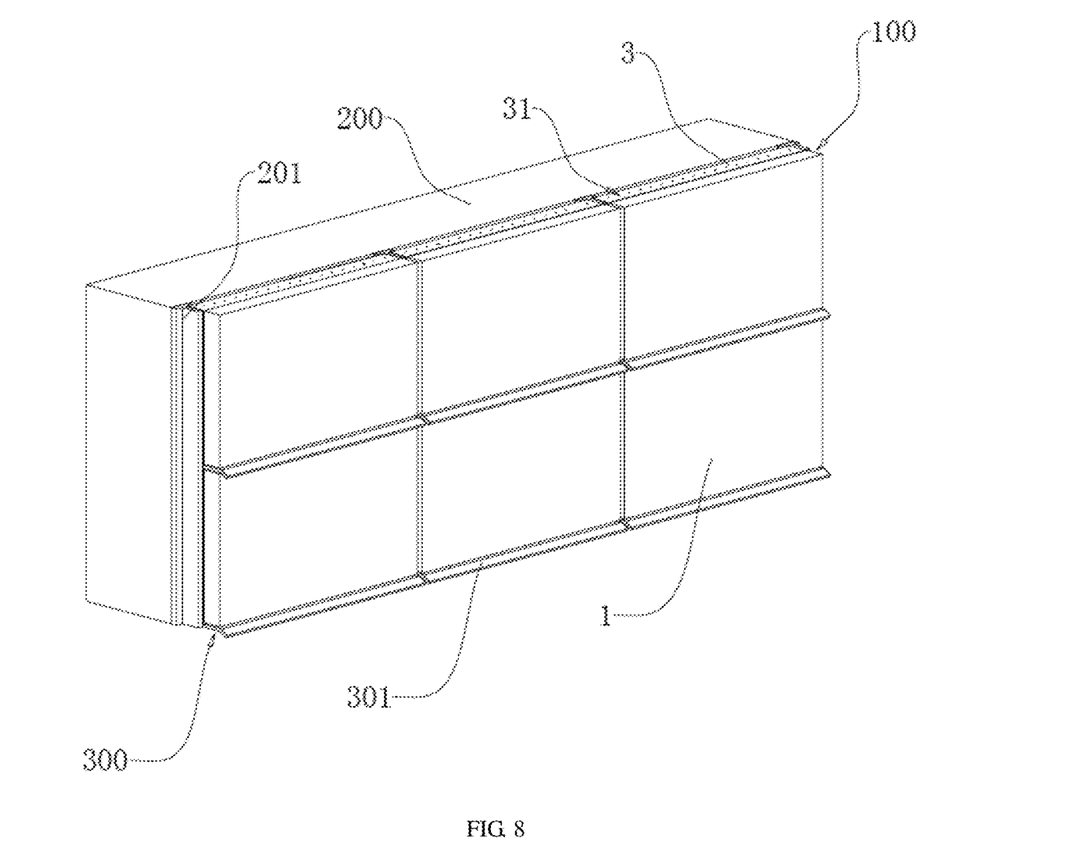
FIG. 8 is a schematic three-dimensional diagram of a fabricated photovoltaic envelope system in embodiment 4 of the present application.

The present embodiment discloses a fabricated photovoltaic envelope system which is reconstructed from an existing building wall. Refer to FIG. 8, the fabricated photovoltaic envelope system includes the prefabricated photovoltaic integrated panels 100 disclosed in embodiment 1, a wall layer 200, and flashings 300.

Refer to FIG. 8, the wall layer 200 is an existing wall; and a plurality of prefabricated photovoltaic integrated panels 100 are provided and are installed in a matrix on an outer wall of the wall layer 200 through lightweight installation joists 201.

The plurality of prefabricated photovoltaic integrated panels 100 form a curtain wall with a solar power generation function on an outer surface of the wall layer 200, thereby not only providing power for existing buildings, but also providing production capacity, omitting a rack and installation equipment of a traditional photovoltaic system, and reducing energy consumption and environmental pollution caused by traditional power generation; at the same time, due to an effect of absorbing solar energy, the solar photovoltaic panel 1 can also adjust an indoor temperature to relieve a pressure and energy consumption of an air conditioner; and therefore, due to the adoption of the curtain wall, the fabricated photovoltaic envelope system improves the effects of energy conservation and emission reduction. At the same time, the formed curtain wall also has the effects such as moisture exhaust and water resistance, heat preservation and heat insulation, fireproofness and sound insulation, which is beneficial to further improvement of high performances of the fabricated photovoltaic envelope system, and then improvement of the comfort of existing buildings.

Refer to FIG. 8, the flashings 300 are strip-shaped plates which have the same length as long sides of the prefabricated photovoltaic integrated panels 100; and the flashings 300 are further provided with water guide folding edges 301 on the long sides. The flashings 300 are installed below the prefabricated photovoltaic integrated panels 100. Specifically, the flashings 300 are connected to bottoms of the corresponding prefabricated photovoltaic integrated panels 100 by installation blocks, and gaps are formed therebetween; and at the same time, a gap is further formed between the flashing 300 and the prefabricated photovoltaic integrated panel 100 (if there is the prefabricated photovoltaic integrated panel) located below the flashing 300. Due to the existence of the gaps, breathable moisture exhaust holes 31 can be prevented from being blocked, so that the gap 213 keeps communicating with the outside to ensure that the moisture and the water can be both smoothly exhausted. At the same time, by disposing the flashings 300, the gap 213 has certain independence, power for migrating external rain to the inside of the prefabricated photovoltaic integrated panels 100 through the gap 213 under the action of a wind pressure is reduced, and the wind and rain infiltration prevention capacity of the prefabricated photovoltaic integrated panels 100 is improved.

It should be noted that the breathable moisture exhaust holes 31 in the upper sides of the prefabricated photovoltaic integrated panel 100 on the topmost layer can be covered (a certain gap is kept) by a roof or a cover plate to avoid direct injection of rain into the gap 213. In addition, electric wires of the solar photovoltaic panel 1 can be traced in the lightweight installation joists 201.

Embodiment 5

Figure 9:
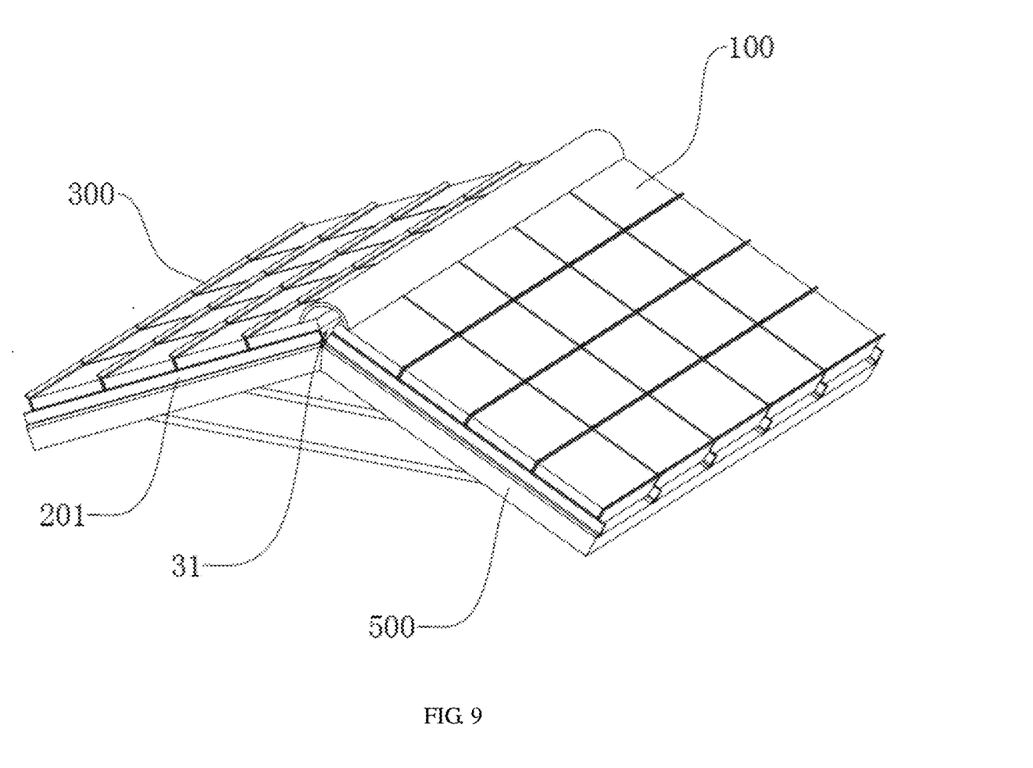
FIG. 9 is a schematic three-dimensional diagram of a fabricated photovoltaic envelope system in embodiment 5 of the present application.

The present embodiment discloses a fabricated photovoltaic envelope system. Refer to FIG. 9, the present embodiment is basically the same as embodiment 4 except that the fabricated photovoltaic envelope system in the present embodiment is applicable to reconstruction of existing building roofs. Therefore, the fabricated photovoltaic envelope system in the present embodiment includes the prefabricated photovoltaic integrated panels 100 disclosed in embodiment 1, a roof body 500, and flashings 300.

Refer to FIG. 9, the roof body 500 is of an existing structure and is shaped like a pitched roof. A plurality of prefabricated photovoltaic integrated panels 100 are provided and are uniformly installed on outer surfaces of slopes on two sides of the roof body 500 through lightweight installation joists 201; and the prefabricated photovoltaic integrated panels 100 located on the slopes at the same side are arranged in a matrix, thereby forming a multifunctional curtain wall on the surface, which not only can generate power and adjust the room temperature, but also can play roles such as moisture exhaust and water resistance, heat preservation and heat insulation, fireproofness and sound insulation, thereby providing more functions for the fabricated photovoltaic envelope system. In addition, the flashings 300 serving as the strip-shaped plates are horizontally arranged below the prefabricated photovoltaic integrated panels 100, and a gap is formed between each of the flashings 300 and each of the prefabricated photovoltaic integrated panels which are located above and below the flashing 300; and a ridge cover plate and an air gap are arranged on a position where two curtain walls of the same roof body 500 are adjacent (i.e., a peak of a roof).

In addition, it should be noted that if the roof body 500 is a flat roof, fabricated photovoltaic envelope system does not need to install the flashings 300 as long as it is ensured that a gap is formed between the two adjacent prefabricated photovoltaic integrated panels 100 and breathable moisture exhaust holes 31 are not blocked. At the same time, if a flat roof structure is adopted, the moisture exhaust property of the moisture management system 2 in each prefabricated photovoltaic integrated panel 100 may be limited to become poor, but technical problems can be still solved.

Embodiment 6

Figure 10:
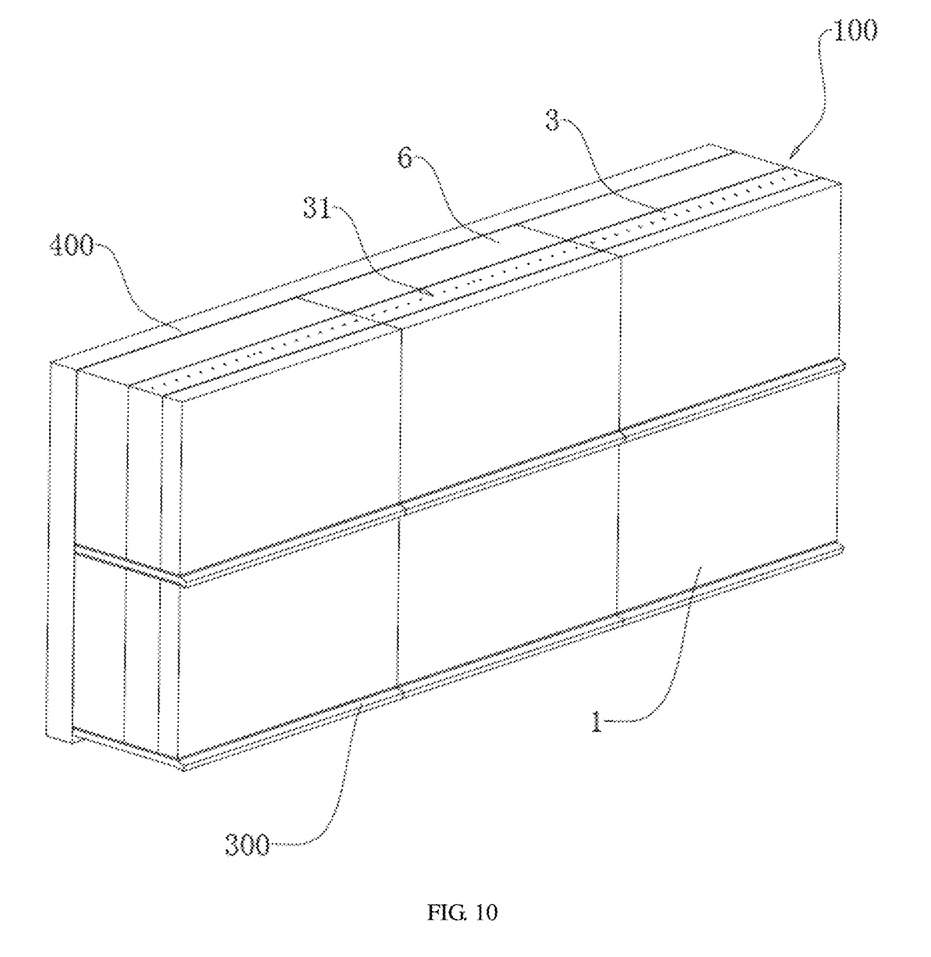
FIG. 10 is a schematic three-dimensional diagram of a fabricated photovoltaic envelope system in embodiment 6 of the present application.

The present embodiment discloses a fabricated photovoltaic envelope system. Refer to FIG. 10, the present embodiment is basically the same as embodiment 4 except that the fabricated photovoltaic envelope system in the present embodiment is applicable to walls of newly constructed buildings. Therefore, the fabricated photovoltaic envelope system in the present embodiment includes the prefabricated photovoltaic integrated panels 100 disclosed in embodiment 3, a building structural frame 400, and flashings 300.

Refer to FIG. 10, the building structural frame 400 is a steel structural frame and consists of vertical frame bars and horizontal frame bars; and the prefabricated photovoltaic integrated panels 100 are arranged in a matrix and are connected to the building structural frame 400. Specifically, the joist layers 6 of the prefabricated photovoltaic integrated panels 100 are fixed to the building structural frame 400 by using bolts; and the second structural plates 8 and the moisture barrier films 9 of the prefabricated photovoltaic integrated panels 100 are located in gaps enclosed by the vertical frame bars and the horizontal frame bars of the building structural frame 400.

By means of the above-mentioned connection, the plurality of prefabricated photovoltaic integrated panels 100 form a wall with a solar power generation function based on the building structural frame 400; the wall not only can generate power by itself and provide power for buildings, but also can provide an output to a power grid, thereby improving the functions of energy conservation and emission reduction of the fabricated photovoltaic envelope system; at the same time, the wall can also improve functions such as moisture exhaust and water resistance, heat preservation and heat insulation, fireproofness and sound insulation of the fabricated photovoltaic envelope system, which is beneficial to the improvement of comfort of constructed buildings.

Refer to FIG. 10, the flashings 300 are strip-shaped plates and are horizontally installed below the prefabricated photovoltaic integrated panels 100. Specifically, the flashings 300 are installed on the building structural frame 400 below the corresponding prefabricated photovoltaic integrated panel 100, and a gap is formed between each of the flashings 300 and the corresponding prefabricated photovoltaic integrated panel 100; at the same time, a gap is further formed between the flashing 300 and the prefabricated photovoltaic integrated panel 100 (if there is the prefabricated photovoltaic integrated panel) located below the flashing 300. Due to the existence of the gaps, breathable moisture exhaust holes 31 can be prevented from being blocked, so that the gap 213 keeps communicating with the outside.

Compared with the fabricated photovoltaic envelope system in embodiment 4, the fabricated photovoltaic envelope system in embodiment 6 is included in original design of a building and replaces a standard building material during construction, thereby being lower in design and installation costs.

Embodiment 7

An embodiment of the present application discloses a construction method for a fabricated photovoltaic envelope system, which is applicable to embodiments 4 and 5 and specifically includes the following steps:

S1, geographical and environmental parameters (such as climate parameters such as a temperature and a humidity) and building requirements of a collected destination (a place where a building needs to be reconstructed) are inputted into WuFi software; and simulated calculation and analysis are performed on a heat and moisture unsteady state of the fabricated photovoltaic envelope system by means of the WuFi software, optimized parameters (such as materials and sizes) of all parts of prefabricated photovoltaic integrated panels 100 are obtained by predicting and analyzing moisture movement, air movement, moisture diffusion movement, heat flow movement, etc. in the fabricated photovoltaic envelope system, and then, integrated is performed to obtain a design solution for the prefabricated photovoltaic integrated panels 100 meeting environmental conditions of the destination.

S2, prefabrication is performed in a prefabrication factory according to an optimized design solution to construct the prefabricated photovoltaic integrated panels 100 (including preset door and window positions) with ideal performances.

S3, the prefabricated photovoltaic integrated panels 100 are transported to a construction site (i.e., the destination); lightweight installation joists 201 are installed on a wall layer 200 or a roof body 500 by using bolts; the prefabricated photovoltaic integrated panels 100 are hoisted and are installed in place and are then fixed to the lightweight installation joists 201 by bolt connection; and flashings 300 are installed, electric wires are arranged well, and thus, the construction of the fabricated photovoltaic envelope system is completed.

In addition, after the fabricated photovoltaic envelope system is constructed and used, simulated calculation and analysis are regularly performed on the heat and moisture unsteady state of the fabricated photovoltaic envelope system by means of software, so that the heat conductivity coefficient, water, moisture, etc. of the fabricated photovoltaic envelope system are within a controllable range.

Embodiment 8

An embodiment of the present application discloses a construction method for a fabricated photovoltaic envelope system, which is applicable to embodiment 6 and specifically includes the following steps:

S1, building requirements and geographical and environmental parameters (such as climate parameters such as a temperature and a humidity) and of a collected destination (a place where a building needs to be reconstructed) are inputted into WuFi software; and simulated calculation and analysis are performed on a heat and moisture unsteady state of the fabricated photovoltaic envelope system by means of the WuFi software, movement conditions of water, air, moisture diffusion and heat flow in the fabricated photovoltaic envelope system are predicted and analyzed, parameters (such as materials and sizes) of all parts of prefabricated photovoltaic integrated panels 100 are optimized, and then, a design solution for the prefabricated photovoltaic integrated panels 100 meeting environmental conditions of the destination is obtained.

S2, prefabrication is performed in a prefabrication factory according to an optimized design solution to construct the prefabricated photovoltaic integrated panels 100 (including preset door and window positions) with ideal performances.

S3, a building structural frame 400 is constructed on a construction site (i.e., the destination); the prefabricated photovoltaic integrated panels 100 are transported to the construction site; the prefabricated photovoltaic integrated panels 100 are installed in place by hoisting, and then, a joist layer 6 is fixed to the building structural frame 400 by bolt connection; and flashings 300 are installed, electric wires are arranged well, and thus, the construction of the fabricated photovoltaic envelope system is completed.

The above descriptions are preferred embodiments of the present application, and are not intended to hereunder limit the protection scope of the present application. Therefore, any equivalent changes made according to a structure, shape and principle in the present application shall fall within the protection scope of the present application.

What is claimed is:

1. A prefabricated photovoltaic integrated panel with a moisture management system, comprising: a solar photovoltaic panel and a moisture management system, which are overlapped with each other, wherein the moisture management system comprises an isobaric rainproof curtain wall and waterproof and moisture permeable cloth, and the isobaric rainproof curtain wall is connected to the solar photovoltaic panel, wherein the prefabricated photovoltaic integrated panel further comprises a heat insulation plate and a first structural plate, wherein the heat insulation plate is arranged between the solar photovoltaic panel and the moisture management system, and the heat insulation plate is one of a graphite polystyrene plate, a rock wool plate, a glass fiber heat preservation cotton plate, or an aerogel plate, wherein the first structural plate is connected to a side surface, facing away from the solar photovoltaic panel, of the moisture management system, wherein the prefabricated photovoltaic integrated panel further comprises a joist layer, a heat preservation layer, and a second structural plate, wherein the joist layer is arranged on a side, facing away from the moisture management system, of the first structural plate, the joist layer comprises a plurality of joists, and the plurality of joists are arranged to form a frame structure, wherein the heat preservation layer is arranged in the frame structure of the joist layer and is made of one or more of graphite polystyrene, aerogel, rock wool, cross-linked polyethylene (XPE) foam, irradiation cross-linked polyethylene (IXPE) foam, or glass fiber heat preservation cotton, and wherein the second structural plate is arranged on a side, away from the first structural plate, of the joist layer.

2. The prefabricated photovoltaic integrated panel with a moisture management system according to claim 1, further comprising: an integrated frame in which the moisture management system is arranged, wherein the solar photovoltaic panel is connected to an outer surface of the integrated frame; and a plurality of breathable moisture exhaust holes are provided on upper and lower sides of the integrated frame directly facing the isobaric rainproof curtain wall.

3. The prefabricated photovoltaic integrated panel with a moisture management system according to claim 1, further comprising: a moisture barrier film arranged between the joist layer and the second structural plate.

4. A fabricated photovoltaic envelope system, comprising: a plurality of the prefabricated photovoltaic integrated panels with a moisture management system according to claim 1, a wall layer, and a plurality of flashings;

the plurality of the prefabricated photovoltaic integrated panels with a moisture management system are arranged in a matrix and are installed outside the wall layer with the plurality of joists, a flashing of the plurality of flashings is installed below each of the plurality of the prefabricated photovoltaic integrated panels with a moisture management system, and a gap is formed between each of the plurality of flashings and each of the plurality of the prefabricated photovoltaic integrated panels with a moisture management system, which are located above and below the flashing.

5. A fabricated photovoltaic envelope system, comprising: a plurality of the prefabricated photovoltaic integrated panels with a moisture management system according to claim 1, a building structural frame, and a plurality of flashings;

the plurality of the prefabricated photovoltaic integrated panels with a moisture management system are arranged in a matrix and are connected to the building structural frame, a flashing of the plurality of flashings is installed below each of the plurality of the prefabricated photovoltaic integrated panels with a moisture management system, and a gap is formed between each of the plurality of flashings and each of the plurality of the prefabricated photovoltaic integrated panels with a moisture management system, which are located above and below the flashing.

6. A fabricated photovoltaic envelope system, comprising: a plurality of the prefabricated photovoltaic integrated panels with a moisture management system according to claim 1 and a roof body;

the plurality of the prefabricated photovoltaic integrated panels with a moisture management system are arranged in a matrix and are installed outside the roof body with the plurality of joists, and a gap is formed between each adjacent two of the plurality of the prefabricated photovoltaic integrated panels with a moisture management system.

* * * * *